(12) United States Patent
Kojima et al.

(10) Patent No.: US 8,889,819 B2
(45) Date of Patent: Nov. 18, 2014

(54) POLYESTER RESIN COMPOSITION, PROCESS FOR PRODUCTION OF SAME, AND FILM

(75) Inventors: Hiroji Kojima, Mishima (JP); Jun Sakamoto, Otsu (JP); Mayumi Sunako, Mishima (JP)

(73) Assignee: Toray Industries, Inc. (JP)

( * ) Notice: Subject to any disclaimer, the term of this patent is extended or adjusted under 35 U.S.C. 154(b) by 308 days.

(21) Appl. No.: 13/203,503

(22) PCT Filed: Mar. 1, 2010

(86) PCT No.: PCT/JP2010/053203
§ 371 (c)(1),
(2), (4) Date: Aug. 26, 2011

(87) PCT Pub. No.: WO2010/103945
PCT Pub. Date: Sep. 16, 2010

(65) Prior Publication Data
US 2011/0313102 A1 Dec. 22, 2011

(30) Foreign Application Priority Data
Mar. 9, 2009 (JP) .................. 2009-054872

(51) Int. Cl.
*C08G 63/00* (2006.01)
*C08G 63/87* (2006.01)

(52) U.S. Cl.
CPC ...................... *C08G 63/87* (2013.01)
USPC ........... 528/286; 528/272; 528/279; 502/102; 502/103; 502/121

(58) Field of Classification Search
CPC ...................................................... C08G 63/87
USPC ........... 528/272, 279, 286; 502/102, 103, 121
See application file for complete search history.

(56) References Cited

U.S. PATENT DOCUMENTS 4,161,579 A * 7/1979 Edelman et al. .............. 525/444

FOREIGN PATENT DOCUMENTS

| JP | 59-196359 A | 11/1984 |
| JP | 60-018539 A | 1/1985 |
| JP | 63-297431 A | 12/1988 |
| JP | 2001-114881 A | 4/2001 |
| JP | 2007-277548 | * 10/2007 |
| JP | 2007-277548 A | 10/2007 |
| JP | 2008-007750 | * 1/2008 |
| JP | 2008-007750 A | 1/2008 |
| JP | 2008-231399 A | 10/2008 |
| JP | 2009-235150 A | 10/2009 |

OTHER PUBLICATIONS

M.J. Maurice et al., "The Determination of Carboxyl Groups in Polyethylene Terephthalate," Anal. Chim. Acta, vol. 22, 1960, pp. 363-368.

* cited by examiner

*Primary Examiner* — Frances Tischler
(74) *Attorney, Agent, or Firm* — DLA Piper LLP (US)

(57) ABSTRACT

A method for producing a polyester resin composition includes conducting polyconensation via esterification or transesterification, wherein an alkali metal phosphate in an amount of 1.3 mol/ton to 3.0 mol/ton and phosphoric acid in an amount of 0.4 to 1.5 times (by mole) that of the alkali metal phosphate are added at a stage between the point of time when the esterication or transesterification has been substantially completed and the point of time when the intrinsic viscosity reaches 0.4. A polyester resin composition obtained by the process exhibits excellent long-term hydrolysis resistance and excellent mechanical characteristics.

11 Claims, No Drawings

POLYESTER RESIN COMPOSITION, PROCESS FOR PRODUCTION OF SAME, AND FILM

RELATED APPLICATIONS

This is a §371 of International Application No. PCT/JP2010/053203, with an international filing date of Mar. 1, 2010 (WO 2010/103945 A1, published Sep. 16, 2010), which is based on Japanese Patent Application No. 2009-054872, filed Mar. 9, 2009, the subject matter of which is incorporated by reference.

TECHNICAL FIELD

This disclosure relates to a polyester resin composition having good hydrolysis resistance, a process for the production thereof, and a film thereof.

BACKGROUND

Polyester has been used for various applications because it is superior in mechanical characteristics, thermal characteristics, chemical resistance, electrical characteristics, and moldability.

However, since polyester deteriorates with respect to mechanical characteristics due to hydrolysis, various studies have been made to control hydrolysis in the case of using it for a long term or in the case of using it under moist conditions. In particular, since films for solar batteries are required to have a lifetime of 20 years or more for outdoor use, they are required to be high in hydrolysis resistance and flame retardancy.

For example, a process for producing a polyester containing a phosphoric acid salt of an alkali metal or an alkaline earth metal has been disclosed in JP 2001-114881 A as a means to enhance hydrolysis resistance.

JP 2007-277548 A discloses a process for producing a polyester containing an inorganic phosphoric acid salt. In the Examples, it is used together with phosphoric acid.

JP 2008-7750 A discloses a polyethylene terephthalate containing a buffer phosphorus compound. In the Examples, it is used together with a phosphorus compound.

However, the use of only a metal phosphate as in the production process of JP '881 can control the initial amount of COOH terminal groups, but it is difficult to control increase in the amount of COOH terminal groups due to hydrolysis. Therefore, sufficient hydrolysis resistance cannot be obtained in applications with which long-term durability is required, such as a solar battery application.

In the production process of JP '548, since the proportion and the application amounts of phosphoric acid and an inorganic phosphoric acid salt are inappropriate, the inorganic phosphoric acid salt is heterogenized easily and mechanical characteristics of a film deteriorate due to a foreign matter. In addition, the film is superior in short-term hydrolysis resistance, but it is insufficient in long-term hydrolysis resistance, which is required for solar battery applications or the like.

In the production process of JP '750 since the type, the proportion, the application amount, and so on of a phosphorus compound are optimized insufficiently, products are insufficient in hydrolysis resistance and mechanical characteristics for solar battery applications.

It could therefore be helpful to provide a polyester composition suitable for films superior in hydrolysis resistance and in mechanical characteristics.

SUMMARY

We thus provide a polyester resin composition comprising an alkali metal phosphate in an amount of 1.3 mol/ton to 3.0 mol/ton, and phosphoric acid in an amount of 0.4 to 1.5 times (by mole) that of the alkali metal phosphate.

We also provide a process for producing a polyester resin composition including conducting polycondensation via esterification or transesterification from an aromatic dicarboxylic acid or an ester-formable derivative of an aromatic dicarboxy acid and a straight-chain alkylene glycol having 2 to 4 carbon atoms, wherein an alkali metal phosphate in an amount of 1.3 mol/ton to 3.0 mol/ton and phosphoric acid in an amount of 0.4 to 1.5 times (by mole) that of the alkali metal phosphate are added at a stage between when the esterification or transesterification has been substantially completed and when intrinside viscosity reaches 0.4.

The polyester resin composition is superior in long-term hydrolysis resistance. Moreover, by processing the polyester resin composition into a biaxially drawn film, it is possible to obtain a film that is suitable for various applications such as magnetic material applications, electrical material applications, e.g., capacitors, and wrapping applications, and especially solar battery applications with which long-term hydrolysis resistance is required.

DETAILED DESCRIPTION

The polyester resin composition is a polyester resin composition comprising an alkali metal phosphate as a phosphorus compound in an amount of 1.3 mol/ton to 3.0 mol/ton, and phosphoric acid as another phosphorus compound in an amount of 0.4 to 1.5 times (by mole) that of the alkali metal phosphate.

From the viewpoint of hydrolysis resistance, it is necessary for the polyester resin composition that its acid component should contain an aromatic dicarboxylic acid component in an amount of 95 mol % or more. Especially, a terephthalic acid component is preferred in view of mechanical characteristics. It is also necessary, from the viewpoint of mechanical characteristics and thermal characteristics, that the glycol component should contain a straight-chain alkylene glycol component having 2 to 4 carbon atoms in an amount of 95 mol % or more. Especially, ethylene glycol, which has two carbon atoms, is preferred from the viewpoint of moldability and crystallizability.

If the content of a copolymerized component exceeds 5 mol %, this will cause decrease in heat resistance due melting point depression and also cause decrease in hydrolysis resistance due to drop in degree of crystallization.

It is necessary from the viewpoint of hydrolysis resistance that the polyester resin composition should contain an alkali metal phosphate in an amount of 1.3 mol/ton to 3.0 mol/ton. It is preferably 1.5 mol/ton to 2.0 mol/ton. When the content of the alkali metal phosphate is less than 1.3 mol/ton, hydrolysis resistance for a long term may be insufficient. On the other hand, when the alkali metal phosphate is contained in a content exceeding 3.0 mol/ton, this is likely to cause heterogenization.

Examples of the alkali metal phosphate include sodium dihydrogen phosphate, disodium hydrogen phosphate, trisodium phosphate, potassium dihydrogen phosphate, dipotassium hydrogen phosphate, tripotassium phosphate, lithium dihydrogen phosphate, dilithium hydrogen phosphate, and trilithium phosphate. Preferred are alkali metal dihydrogen phosphates and di(alkali metal) hydrogen phosphates. Alkali metal phosphates in which the alkali metal is Na or K are preferred from the viewpoint of long-term hydrolysis resistance. Particularly preferred are sodium dihydrogen phosphate and potassium dihydrogen phosphate.

It is necessary from the viewpoint of long-term hydrolysis resistance that the content of the phosphoric acid should be 0.4 to 1.5 times of the alkali metal phosphate in a molar ratio. It is preferably 0.8 to 1.4 times. If it is less than 0.4 times, the long-term hydrolysis resistance may deteriorate. If it exceeds 1.5 times, a polymerization catalyst will be deactivated by an excess of the phosphoric acid and, as a result, polymerization will be delayed and the amount of terminal COOH groups will increase, so that hydrolysis resistance may deteriorate.

According to calculation from the contents of the alkali metal phosphate and the phosphoric acid, the polyester resin composition contains an alkali metal element in an amount of 1.3 mol/ton to 9.0 mol/ton and phosphorus element in an amount of 1.8 mol/ton to 7.5 mol/ton. In view of the type of a preferred alkali metal phosphate, the composition preferably contains an alkali metal element in an amount of 1.3 mol/ton to 6.0 mol/ton and phosphorus element in an amount of 1.8 mol/ton to 7.5 mol/ton.

From the viewpoint of reduction in the amount of terminal COOH groups and inhibition of foreign matter formation, it is preferred that the total content of the phosphorus compounds contained in the polyester resin composition is 30 ppm to 150 ppm in terms of the amount of phosphorus element. It is more preferably 60 ppm to 150 ppm.

It is preferred that the polyester resin composition contains a metal compound whose metal element is at least one member selected from the group consisting of Na, Li, and K, a metal compound whose metal element is at least one member selected from the group consisting of Mg, Ca, Mn, and Co, and a metal compound whose metal element is at least one member selected from the group consisting of Sb, Ti, and Ge, and the total amount of these metal elements is adjusted to 30 ppm or more and 500 ppm or less relative to the whole portion of the polyester resin composition. By adjusting the total amount of the metal elements to this range, the amount of terminal COOH groups can be reduced and heat resistance is improved. It is more preferably 40 ppm to 300 ppm. Na, Li, and K are alkali metal elements. Mg, Ca, Mn, and Co, which are divalent metal elements, give a function as a transesterification catalyst or electrostatic characteristics in film production. Sb, Ti, and Ge, which are metal elements having ability to catalyze polymerization, function as a polymerization catalyst.

It is preferred for the polyester resin composition from the viewpoint of hydrolysis resistance that the increase in the amount of terminal COOH groups between before and after a wet-heating treatment is 90 eq./ton (equivalents/ton) or less. It is more preferably 70 eq./ton or less and particularly preferably 50 eq./ton. Specifically, a polymer is shaped by extrusion to form an undrawn sheet having a thickness of 150 μm, which is then subjected to a humidifying-heating treatment under a saturated steam atmosphere at 155° C. for 4 hours. An increase in the amount of terminal COOH groups between before and after the wet-heating treatment is measured. At this time, the undrawn sheet is needed to be substantially in an amorphous state as a result of being cooled rapidly on a mirror-finished drum or the like. The crystallization state of a polymer has a great influence in the wet-heating treatment. Therefore, a crystallized polymer after drying and after solid phase polymerization is not suitable for evaluating long-term hydrolysis resistance for solar battery applications because hydrolysis is difficult to proceed therein.

Moreover, it is preferred that the polyester resin composition is a polyethylene terephthalate resin composition and the increase in the amount of terminal COOH groups is within the above-described range. Since polyethylene terephthalate is lower in crystallizability than polybutylene terephthalate and polybutylene naphthalate, crystallization and whitening just after extrusion do not occur easily. Moreover, since polyethylene terephthalate is lower in glass transition point and lower in stretch stress than polyethylene naphthalate, it is superior in film moldability, for example, it permits easy stretch control. A polyethylene terephthalate resin having an increase in the amount of terminal COOH groups falling within the above-described range has long-term hydrolysis resistance in addition to superior characteristics that polyethylene terephthalate inherently has.

It is preferred from the viewpoint of mechanical characteristics that the polyester resin composition has an intrinsic viscosity of 0.6 to 1.0. It is more preferably 0.7 to 0.9 from the viewpoint of reduction in the amount of terminal COOH groups and heat resistant.

It is preferred for the polyester resin composition from the viewpoint of hydrolysis resistance that the amount of terminal COOH groups of a polymer just before being supplied to a film production machine is 20 eq./ton or less. It is more preferably 15 eq./ton or less.

It is preferred from the viewpoint of inhibition of foreign matter formation that such a polyester resin composition has a nitrogen content of 100 ppm or less. That is, it is preferred to contain substantially no end-capping agent containing nitrogen element, such as carbodiimide and oxazoline. An end-capping agent reacts with a terminal COOH group and, as a result, it easily generates foreign matters, such as a gel, during a reaction, causing deterioration in mechanical characteristics.

It is preferred from the viewpoint of retention of elongation, polymerization reactivity, and moldability that the polyester resin composition contains a copolymerized component having three or more functionalities in an amount of 0.01 mol % to 1.00 mol % relative to all the acid components. It is more preferably 0.01 mol % to 0.50 mol %.

Examples of the copolymerized component having three or more functionalities include polycarboxylic acids such as trimellitic acid, cyclohexanetricarboxylic acid, a biphenyl tetracarboxylic acid, pyromellitic acid, butanetetracarboxylic acid, trimer acids produced by trimerizing long-chain aliphatic carboxylic acids, and their anhydrides and esters; polyhydric alcohols such as glycerol, pentaerythritol, dipentaerythritol, trimethylolpropane, ditrimethylolpropane, trihydroxybenzene, and trihydroxyhexane; and polyhydroxycarboxylic acids such as citric acid, dihydroxybenzenecarboxylic acid, and dihydroxynaphthalene carboxylic acid, and their anhydrides and esters. In particular, it is preferred from the viewpoint of retention of elongation and film moldability that the copolymerized component is a copolymerized component having three functionalities. As to the process of adding such a copolymerized component having three or more functionalities, it is preferred from the viewpoint of reactivity and handling property to add it before transesterification in the cases of a polycarboxylic acid ester and a polyhydric alcohol component and to add it in the form of a solution or slurry in ethylene glycol in the case of a polycarboxylic acid.

The process for producing the polyester resin composition is a process for producing a polyester resin composition by conducting a polycondensation via esterification or transesterification from an aromatic dicarboxylic acid or an esterformable derivative of an aromatic dicarboxylic acid and a straight-chain alkylene glycol having 2 to 4 carbon atoms, the process comprising a first step of performing esterification or transesterification, a second step of adding additives such as a polymerization catalyst and a phosphorus compound, and a third step of performing polymerization. As necessity, a fourth step of performing solid phase polymerization may be added.

In the first step, the esterification or transesterification can be performed by a conventional method using, for example, terephthalic acid, or dimethyl terephthalate and ethylene glycol. For example, when performing transesterification, a transesterification catalyst, such as magnesium acetate, calcium acetate, manganese acetate, and cobalt acetate, can be used, and antimony trioxide, which is a polymerization catalyst, and the like may also be added. In the esterification, generation of diethylene glycol as a by-product is inhibited and also hydrolysis resistance is improved if an alkali metal such as potassium hydroxide has been added in an amount of several ppm.

The second step is a step of adding additives such as a polymerization catalyst and a phosphorus compound at a stage between the point of time when the esterification or transesterification has been substantially completed and the point of time when the intrinsic viscosity reaches 0.4.

As a polymerization catalyst, a solution of germanium dioxide in ethylene glycol, antimony trioxide, titanium alkoxide, titanium chelate compounds, and so on can be used.

It is necessary from the viewpoint of hydrolysis resistance that an alkali metal phosphate in an amount of 1.3 mol/ton to 3.0 mol/ton is added as the phosphorus compound. A preferred addition amount is 1.5 mol/ton to 2.0 mol/ton. When the addition amount of the alkali metal phosphate is less than 1.3 mol/ton, hydrolysis resistance for a long term may be insufficient. On the other hand, when the alkali metal phosphate is added in an amount exceeding 3.0 mol/ton, this is likely to cause heterogenization. Moreover, from the viewpoint of inhibition of foreign matter formation and long-term hydrolysis resistance, it is necessary to add phosphoric acid as the phosphorus compound in an amount of 0.4 to 1.5 times (by mole) that of the alkali metal phosphate. A preferred addition amount is 0.8 to 1.4 times. If it is less than 0.4 times, the long-term hydrolysis resistance may deteriorate. If it exceeds 1.5 times, a polymerization catalyst will be deactivated by an excess of the phosphoric acid, and as a result polymerization will be delayed and the amount of terminal COOH groups will increase, so that hydrolysis resistance may deteriorate. In particular, it is desirable from the viewpoint of heat resistance and long-term hydrolysis resistance to adjust the amount of an alkali metal element to 1.3 mol/ton or more and 6.0 mol/ton or less and the amount of phosphorus element to 1.8 mol/ton or more and 7.5 mol/ton or less.

As to the process of adding phosphoric acid and the alkali metal phosphate, it is preferred, from the viewpoint of long-term hydrolysis resistance, to add and mix them after dissolving them in ethylene glycol or the like beforehand. As to the kinds of the solvent or dispersing medium to be used at this time, it is preferred from the viewpoint of heat resistance and hydrolysis resistance to use the same alkylene glycol as the straight-chain alkylene glycol having 2 to 4 carbon atoms contained in the polyester resin composition. If another kind of alkylene glycol is used, heat resistance may deteriorate due to occurrence of copolymerization.

In particular, it is preferred from the viewpoint of inhibition of foreign matter formation to adjust the mixed liquid at this time to an acidic pH of 2.0 to 6.0. More preferably, the pH is 4.0 to 6.0.

It is preferred from the viewpoint of polymerization reactivity to add the phosphorus compound at an interval of 5 minutes or more from the addition of the polymerization catalyst, and it may be added either before or after the addition of the polymerization catalyst.

Examples of other additives include magnesium acetate for the purpose of imparting electrostatic characteristics, calcium acetate as a co-catalyst, and hindered phenol type antioxidants, which may be added as far as they do not impair the effect of this disclosure. Particularly, in the case of having experienced esterification, further addition of ethylene glycol such that the total amount of ethylene glycol may become 1.5 to 1.8 times the amount of terephthalic acid in molar ratio is effective for improving hydrolysis resistance because it can reduce terminal COOH groups.

On the other hand, to impart slipping property to a film, it is possible to add various types of particles or incorporate internally formed particles using a catalyst.

In the third step, the polymerization can be performed by a conventional method. Moreover, to reduce the amount of terminal COOH groups, it is effective to adjust the polymerization temperature up to a temperature that is 30° C. higher than the melting point of a polyester resin composition, and perform the solid phase polymerization of the fourth step after temporarily forming chips at an intrinsic viscosity of 0.5 to 0.6.

In the fourth step, it is preferred to perform a solid phase polymerization at a solid phase polymerization temperature that is not higher than a temperature 30° C. lower than the melting point of the polyester resin composition and not lower than a temperature 60° C. lower than the melting point of the polyester resin composition, and a degree of vacuum of 0.3 Torr or less.

The thus-obtained polyester resin composition can be subjected, after drying, to extrusion using a conventional extruder and a conventional T die and biaxial stretching. At this time, feed of chips to the extruder is preferably performed under a nitrogen atmosphere. The shorter the time taken before being extruded through the T die, the better. It is preferred, from the viewpoint of inhibition of increase of terminal COOH groups, to adjust the time to 30 minutes or shorter as a standard.

The thus-produced film which is made of the polyester resin composition is not only low in content of terminal COOH groups and superior in short-term hydrolysis resistance but also superior in long-term hydrolysis resistance, which is needed for such application as films for solar batteries or the like, due to the action of phosphoric acid and the alkali metal phosphate.

EXAMPLES

A. Intrinsic Viscosity

Measurement was conducted at 25° C. using o-chlorophenol solvent.

B. Determination of the Amount of Phosphorus in a Polymer

Measurement was conducted using a fluorescent X-ray analyzer (Model No.: 3270) manufactured by Rigaku Corporation.

C. Determination of the Amount of Alkali Metal in a Polymer

Measurement was carried out by an atomic absorption method (Polarized Zeeman Atomic Absorption Spectrophotometer 180-80, manufactured by Hitachi, Ltd., flame: acetylene-air).

D. The Amount of Terminal COOH Groups

Measurement was carried out by the method of Maurice. (Document: M. J. Maurice, F. Huizinga, Anal. Chim. Acta, 22 363 (1960)).

E. Evaluation of Hydrolysis Resistance

A polymer was fed to a single screw extruder, extruded through a T die at 280° C. into a sheet form, and rapidly cooled on a mirror-finished drum controlled to a temperature of 20° C., so that a 150-μm thick undrawn sheet that was substantially in an amorphous state was obtained.

The resulting undrawn sheet was treated at 155° C. in a saturated steam for 4 hours.

The increase in the amount of terminal COOH groups was evaluated on the basis of the difference between before and after the treatment of the undrawn sheet (ΔCOOH).

F. Calculation of a Retention of Elongation

Using a biaxially drawn film, a degree of film elongation was measured before and after a PCT (pressure cooker test) treatment performed at 125° C., 100% RH for 48 hours, and then a retention of elongation after the treatment relative to the sample before the treatment was calculated in percentage.

The degree of film elongation was measured under the following conditions by using an Instron type tensile tester in accordance with the method specified in ASTM-d882:

Measuring instrument: film strength and elongation measuring instrument "Tensilon AMF/RTA-100" manufactured by Orientec Co., Ltd.
Sample size: 10 mm in width and 100 mm in length
Tensile speed: 200 mm/minute
Measuring environment: 23° C., 65% RH.

A retention of elongation of 50% or more, that corresponds to a lifetime of 20 years or more in a solar battery application was considered to be acceptable.

G. Nitrogen Content

Measurement was carried out by the Kjeldahl method described in JIS K2609 Crude petroleum and petroleum products-Determination of nitrogen content.

Example 1

First step: 100 parts by mass of dimethyl terephthalate, 57.5 parts by mass of ethylene glycol, 0.06 parts by mass of magnesium acetate, and 0.03 parts by mass of antimony trioxide were melted at 150° C. under a nitrogen atmosphere. The resulting molten material was heated under stirring to 230° C. over 3 hours, thereby distilling methanol out to complete transesterification.

Second step: After the completion of the transesterification, an ethylene glycol solution (pH 5.0) prepared by dissolving 0.019 parts by mass (equivalent to 1.9 mol/ton) of phosphoric acid and 0.027 parts by mass (equivalent to 1.7 mol/ton) of sodium dihydrogen phosphate dihydrate in 0.5 parts by mass of ethylene glycol was added. The intrinsic viscosity at this time was less than 0.2.

The third step: Polymerization was performed at a final achievement temperature of 285° C. and a degree of vacuum of 0.1 Torr, so that a polyethylene terephthalate having an intrinsic viscosity of 0.52 and 15 eq./ton of terminal COOH groups was obtained.

Fourth step: The resulting polyethylene terephthalate was dried and crystallized at 160° C. for 6 hours. Then, solid phase polymerization at 220° C., a degree of vacuum of 0.3 Torr, for 8 hours was performed, so that a polyethylene terephthalate having an intrinsic viscosity of 0.85 and 10.2 eq./ton of terminal COOH groups was obtained.

The polyethylene terephthalate after the solid phase polymerization was fed to an extruder under a nitrogen atmosphere. It was discharged through a T die at an extrusion temperature of 280° C. and cooled rapidly on a casting drum (20° C.), so that it was converted into a sheet by an electrostatic application method. This sheet was longitudinally drawn at a longitudinally drawing temperature of 90° C. and a longitudinally drawing ratio of 3.6 times and then laterally drawn at a laterally drawing temperature of 110° C. and a laterally drawing ratio of 3.6 times followed by performing heat treatment at 210° C. for 3 seconds, so that a biaxially drawn film was obtained.

As the filter of the extruder used at this time, a 400-mesh wire gauze was used. The residence time taken from the polymer feed to the discharge through the T die was about 5 minutes.

Hydrolysis resistance was evaluated, and it was found that the amount of terminal COOH groups of the undrawn sheet before the treatment was 12.0 eq./ton and the amount of terminal COOH groups after performing a treatment at 155° C. under saturated steam for 4 hours was 46.1 eq./ton, which means that the hydrolysis resistance was good. As to a nitrogen content, 60 ppm of nitrogen was detected though no nitrogen compounds were added. It is presumed that this was because some nitrogen was incorporated due to the fact that molding was carried out under a nitrogen atmosphere.

Moreover, the resulting biaxially drawn film was compared with respect to degree of film elongation before and after treatment at 125° C. and 100% RH for 48 hours, and then a retention of elongation was calculated to be 65%.

Example 2

A polyethylene terephthalate and a biaxially drawn film were obtained in the same manner as in Example 1 except for exchanging sodium dihydrogen phosphate for potassium dihydrogen phosphate.

The resulting film exhibited performance that was almost equivalent to Example 1 as shown in Table 1.

Examples 3, 4, 10, and 11, Comparative Examples 1, 2, 3, 5, 6, 7, and 8

A polyethylene terephthalate and a biaxially drawn film were obtained in the same manner as in Example 1 except for changing the addition amounts and the mixing ratio of phosphoric acid and sodium dihydrogen phosphate.

In Example 3, the addition amount of an alkali metal phosphate was reduced and the molar ratio of phosphoric acid/alkali metal phosphate was increased in comparison to Example 1. As a result, the increase in the amount of terminal COOH groups detected between before and after the wet-heating treatment became larger in comparison to Example 1 though characteristics as a film for a solar battery were maintained.

In Example 4, the addition amount of an alkali metal phosphate was increased and the molar ratio of phosphoric acid/alkali metal phosphate was reduced in comparison to Example 1. As a result, the retention of elongation decreased while characteristics as a film for a solar battery were maintained though the increase in the amount of terminal COOH groups detected between before and after the wet-heating treatment became smaller in comparison to Example 1.

In Example 10, the addition amounts of sodium dihydrogen phosphate and phosphoric acid were reduced and the molar ratio of phosphoric acid/sodium dihydrogen phosphate was reduced in comparison to Example 1. As a result, both the amount of terminal COOH groups and the Δ terminal COOH group increased in comparison to Example 1. A retention of elongation was reduced in comparison to Example 1, but characteristics as a film for a solar battery were maintained.

In Example 11, the addition amounts of sodium dihydrogen phosphate and phosphoric acid were increased and the molar ratio of phosphoric acid/sodium dihydrogen phosphate was increased in comparison to Example 1. As a result, the polymerization was elongated, and both the amount of terminal COOH groups and the Δ terminal COOH group increased in comparison to Example 1. A retention of elongation was reduced in comparison to Example 1, but characteristics as a film for a solar battery were maintained.

In Comparative Example 1, since phosphoric acid was reduced excessively, the initial amount of terminal COOH groups increased, and the retention of elongation was 35%, which means that performance was insufficient.

In Comparative Example 2, since sodium dihydrogen phosphate was increased excessively, sodium dihydrogen phosphate was heterogenized. As a result, the initial amount of terminal COOH groups decreased, but heterogenized sodium dihydrogen phosphate did not function, the increase in the amount of terminal COOH groups detected between before and after the wet-heating treatment became large, and the retention of elongation was also insufficient.

In Comparative Example 3, since no sodium dihydrogen phosphate was added, the initial amount of terminal COOH groups was small, but the increase in the amount of terminal COOH groups detected between before and after the wet-heating treatment became remarkably large, and the retention of elongation was also insufficient.

In Comparative Example 5, since no phosphoric acid was added, the heat resistance deteriorated, the increase in the amount of terminal COOH groups detected between before and after the wet-heating treatment became remarkably large, and the retention of elongation was also insufficient.

In Comparative Example 6, since sodium dihydrogen phosphate was reduced excessively, the retention of elongation decreased, and characteristics as a film for a solar battery were insufficient.

In Comparative Example 7, since the amount of phosphoric acid was increased so that the molar ratio of phosphoric acid/sodium dihydrogen phosphate was made excessively large, the retention of elongation decreased, and characteristics as a film for a solar battery were insufficient.

In Comparative Example 8, citric acid in an amount equivalent to 1.9 mol/ton was added instead of phosphoric acid, so that a Δ terminal COOH group increased greatly, the retention of elongation decreased remarkably, and characteristics as a film for a solar battery were insufficient.

Example 5

A polyethylene terephthalate and a biaxially drawn film were obtained in the same manner as in Example 1 except for performing the polymerization in the third step until the intrinsic viscosity reached 0.65 and omitting the fourth step.

Since the resulting polyethylene terephthalate was one in which the initial amount of terminal COOH groups was larger than 20 eq./ton as a result of performing polymerization to an intrinsic viscosity of 0.65 without performing solid phase polymerization, the increase in the amount of terminal COOH groups detected between before and after the wet-heating treatment became larger though characteristics as a film for a solar battery were maintained. Moreover, the retention of elongation also decreased.

Example 6

A polyethylene terephthalate and a biaxially drawn film were obtained in the same manner as in Example 1 except for using trisodium phosphate as the alkali metal phosphate and increasing the amount of antimony trioxide. Trisodium phosphate was strong alkali and the pH of its mixed solution with phosphoric acid was 7.5.

As a result, the initial amount of terminal COOH groups decreased and the increase in the amount of terminal COOH groups detected between before and after the wet-heating treatment increased. The retention of elongation decreased though characteristics as a film for a solar battery were maintained.

Example 7

A polyethylene terephthalate and a biaxially drawn film were obtained in the same manner as in Example 1 except for reducing the addition amounts of magnesium acetate and antimony trioxide.

The initial amount of terminal COOH groups decreased due to the reduction in amount of magnesium acetate and antimony trioxide. This is probably because the heat resistance of the composition was improved due to the decrease in the content of the metal compound.

On the other hand, characteristics as a film for a solar battery were maintained though the intrinsic viscosity decreased in correspondence to the reduction in the amount of the catalyst.

Example 8

A polyethylene terephthalate and a biaxially drawn film were obtained in the same manner as in Example 1 except for shortening the solid phase polymerization time of the fourth step.

Characteristics as a film for a solar battery were maintained though the initial amount of terminal COOH groups and the increase in the amount of terminal COOH groups detected between before and after the wet-heating treatment became larger in correspondence to the reduction in the solid phase polymerization time.

Example 9

A polyethylene terephthalate and a biaxially drawn film were obtained in the same manner as in Example 1 except for exchanging the polymerization catalyst for titanium diisopropoxide bisethylacetoacetate, and adding no magnesium acetate.

There were no problems with the initial amount of terminal COOH groups or the increase in the amount of terminal COOH groups detected between before and after the wet-heating treatment, but unevenness in thickness was produced due to the fact that electrostatic application casting became unstable in film production. As a result, characteristics as a film for a solar battery were maintained, but the retention of elongation decreased.

Comparative Example 4

A polyethylene terephthalate and a biaxially drawn film were obtained in the same manner as in Example 1 except for exchanging phosphoric acid for trimethyl phosphate.

Because of the use of trimethyl phosphate instead of phosphoric acid, the effect of sodium dihydrogen phosphate to inhibit the increase in the amount of terminal COOH groups was weakened, and the increase in the amount of terminal COOH groups detected between before and after the wet-heating treatment became larger. Moreover, the retention of elongation was insufficient.

Comparative Example 9

A polyethylene terephthalate and a biaxially drawn film were obtained in the same manner as in Example 1 except for exchanging sodium dihydrogen phosphate for sodium phosphite.

Due to the exchange of sodium dihydrogen phosphate for sodium phosphite, a Δ terminal COOH group tended to increase and the retention of elongation became insufficient.

Example 12

Into an esterification apparatus into which 114 parts by mass (equivalent to 100 parts by mass of PET) of bishydroxyethylene terephthalate had been fed beforehand, a slurry composed of 86 parts by mass of terephthalic acid and 37 parts by mass of ethylene glycol was fed over 3 hours by using a snake pump, and esterification was performed while the temperature of the reactant was controlled at 245° C. to 255° C.

After completion of the esterification, 114 parts by mass (equivalent to 100 parts by mass of PET) of the resulting bishydroxyethylene terephthalate was transferred to a polymerization can, followed by addition of 0.06 parts by mass of magnesium acetate tetrahydrate and 0.03 parts by mass of antimony trioxide, and then a reaction was performed for 30 minutes under stirring, thereby distilling water out. Then, an ethylene glycol solution (pH 5.0) prepared by dissolving 0.019 parts by mass (equivalent to 1.9 mol/ton) of phosphoric acid and 0.027 parts by mass (equivalent to 1.7 mol/ton) of sodium dihydrogen phosphate dihydrate in 0.5 parts by mass of ethylene glycol was added. The intrinsic viscosity at this time was 0.24. Then, the pressure was reduced while the temperature was raised from 255° C. to 280° C., and polycondensation was performed at an ultimate temperature of 280° C. and a degree of vacuum of 0.1 Torr. Thus, a polyethylene terephthalate having an intrinsic viscosity of 0.62 and 18.0 eq./ton of terminal COOH groups was obtained.

The resulting polyethylene terephthalate was dried and crystallized at 160° C. for 6 hours and then subjected to solid phase polymerization of 8 hours at 220° C. and a degree of vacuum of 0.3 Torr, so that a polyethylene terephthalate having an intrinsic viscosity of 0.85 and 13.1 eq./ton of terminal COOH groups was obtained. Further, a biaxially drawn film was obtained in the same manner as in Example 1. The resulting biaxially drawn film was increased in the amount of terminal COOH groups and Δ terminal COOH group in comparison to Example 1, but it was at a satisfactory level as a film for a solar battery.

Example 13

A biaxially drawn film was obtained in the same manner as in Example 12 except for adjusting the polymerization temperature to 290° C. and the intrinsic viscosity to 0.68 and omitting solid phase polymerization.

In the resulting film, both the amount of terminal COOH groups and the Δ terminal COOH group increased in comparison to Example 12. Although the retention of elongation decreased, characteristics as a film for a solar battery were maintained.

Examples 14, 15

A polyethylene terephthalate and a biaxially drawn film were obtained in the same manner as in Example 1 except for exchanging magnesium acetate for manganese acetate or calcium acetate.

In Example 14, due to the use of manganese acetate, the amount of terminal COOH groups after solid phase polymerization was 9.2 eq./ton, whereas the amount of terminal COOH groups of the undrawn sheet was 9.5 eq./ton, which means that heat resistance was good. Moreover, the increase in the amount of terminal COOH groups decreased in comparison to Example 1, which means that hydrolysis resistance was also good and the product was satisfactory as a film for a solar battery.

In Example 15, in which calcium acetate was used, the increase in the amount of terminal COOH groups tended to decrease in comparison to Example 1 and the product was satisfactory as a film for a solar battery.

Examples 16, 17

A polyethylene terephthalate and a biaxially drawn film were obtained in the same manner as in Example 1 except for adding trimellitic acid trimethyl as a copolymerized component before transesterification.

In Example 16, the polymerization time was shortened successfully and the amount of terminal COOH groups tended to decrease because of the fact that trimethyl trimellitate was copolymerized in an amount of 0.05 mol % relative to the whole acid component. The retention of elongation, which was also improved in comparison to Example 1, was a characteristic satisfactory as a film for a solar battery.

In Example 17, the polymerization time was shortened more than in Example 16 and the amount of terminal COOH groups tended to decrease because of the fact that trimethyl trimellitate was copolymerized in an amount of 0.05 mol % relative to the whole acid component. Although the melt viscosity was high and the filter pressure and the extrusion torque to be applied tended to increase due to a high intrinsic viscosity in association with crosslinking caused by trimethyl trimellitate, the resulting film was improved in retention of elongation in comparison to Example 1 and Example 16, and it had characteristics satisfactory as a film for a solar battery.

Example 18

A polyethylene terephthalate and a biaxially drawn film were obtained in the same manner as in Example 1 except for adding butanetetracarboxylic acid in the form of an ethylene glycol solution (5 wt %) after transesterification.

The polymerization time was shortened successfully and the amount of terminal COOH groups tended to decrease because of the fact that butane tetracarboxylic acid was copolymerized in an amount of 0.1 mol % relative to the whole acid component. The retention of elongation, which was also improved in comparison to Example 1, was a characteristic satisfactory as a film for a solar battery.

In every Example and Comparative Example, a nitrogen content of 60 ppm was detected despite the fact that no nitrogen-containing substance was used as a raw material. This is presumably because a nitrogen compound had remained as an impurity in a raw material such as terephthalic acid or ethylene glycol, or gaseous nitrogen was dissolved in a polyester resin composition during melt-molding in a nitrogen atmosphere.

TABLE 1

| Alkali metal phosphate | Example 1 Sodium dihydrogen phosphate | Example 2 Potassium dihydrogen phosphate | Example 3 Sodium dihydrogen phosphate |
|---|---|---|---|
| Addition amount (mol/ton) | 1.7 | 1.7 | 1.4 |
| Phosphoric acid/alkali metal phosphate | 1.12 | 1.12 | 1.36 |
| pH | 5.0 | 5.0 | 4.5 |
| Alkali metal | Na | K | Na |
| Amount of alkali metal (ppm) | 39 | 67 | 32 |
| Divalent metal | Mg | Mg | Mg |
| Amount of divalent metal (ppm) | 68 | 68 | 68 |
| Polymerization catalyst metal | Sb | Sb | Sb |
| Amount of polymerization catalyst metal (ppm) | 251 | 251 | 251 |
| Total amount of metal (ppm) | 358 | 386 | 351 |
| Amount of phosphorus (ppm) | 112 | 112 | 102 |
| Nitrogen content (ppm) | 60 | 60 | 60 |
| Intrinsic viscosity | 0.85 | 0.85 | 0.85 |
| COOH terminal group (eq./t) | 10.2 | 10.5 | 12.8 |
| ΔCOOH terminal group (eq./t) | 34.1 | 36.4 | 43.9 |
| Retention of elongation (%) | 65 | 65 | 65 |

COOH terminal group: a value of a chip before shaping
ΔCOOH: the increase in the number of COOH terminal groups between before and after a wet-heating treatment of an undrawn sheet

TABLE 2

| Alkali metal phosphate | Example 4 Sodium dihydrogen phosphate | Example 5 Sodium dihydrogen phosphate | Example 6 Trisodium phosphate |
|---|---|---|---|
| Addition amount (mol/ton) | 2.8 | 1.7 | 1.7 |
| Phosphoric acid/alkali metal phosphate | 0.54 | 1.12 | 1.12 |
| pH | 5.5 | 5.0 | 7.5 |
| Alkali metal | Na | Na | Na |
| Amount of alkali metal (ppm) | 64 | 39 | 117 |
| Divalent metal | Mg | Mg | Mg |
| Amount of divalent metal (ppm) | 68 | 68 | 68 |
| Polymerization catalyst metal | Sb | Sb | Sb |
| Amount of polymerization catalyst metal (ppm) | 251 | 251 | 292 |
| Total amount of metal (ppm) | 383 | 358 | 477 |
| Amount of phosphorus (ppm) | 133 | 112 | 102 |
| Nitrogen content (ppm) | 60 | 60 | 60 |
| Intrinsic viscosity | 0.82 | 0.65 | 0.82 |
| COOH terminal group (eq./t) | 8.2 | 21.5 | 8.1 |
| ΔCOOH terminal group (eq./t) | 30.9 | 55.3 | 35.7 |
| Retention of elongation (%) | 60 | 55 | 50 |

COOH terminal group: a value of a chip before shaping
ΔCOOH: the increase in the number of COOH terminal groups between before and after a wet-heating treatment of an undrawn sheet

TABLE 3

| Alkali metal phosphate | Example 7 Sodium dihydrogen phosphate | Example 8 Sodium dihydrogen phosphate | Example 9 Sodium dihydrogen phosphate |
|---|---|---|---|
| Addition amount (mol/ton) | 1.7 | 1.7 | 1.7 |
| Phosphoric acid/alkali metal phosphate | 1.12 | 1.12 | 1.12 |
| pH | 5.0 | 5.0 | 5.0 |
| Alkali metal | Na | Na | Na |
| Amount of alkali metal (ppm) | 39 | 39.1 | 39 |
| Divalent metal | Mg | Mg | — |
| Amount of divalent metal (ppm) | 45 | 68 | — |
| Polymerization catalyst metal | Sb | Sb | Ti |
| Amount of polymerization catalyst metal (ppm) | 209 | 251 | 10 |
| Total amount of metal (ppm) | 293 | 358 | 49 |
| Amount of phosphorus (ppm) | 112 | 112 | 112 |
| Nitrogen content (ppm) | 60 | 60 | 60 |
| Intrinsic viscosity | 0.82 | 0.65 | 0.80 |
| COOH terminal group (eq./t) | 8.3 | 14.6 | 10.5 |
| ΔCOOH terminal group (eq./t) | 30.2 | 45.2 | 34.6 |
| Retention of elongation (%) | 70 | 55 | 65 |

COOH terminal group: a value of a chip before shaping
ΔCOOH: the increase in the number of COOH terminal groups between before and after a wet-heating treatment of an undrawn sheet

TABLE 4

| Alkali metal phosphate | Comparative Example 1 Sodium dihydrogen phosphate | Comparative Example 2 Sodium dihydrogen phosphate | Comparative Example 3 — |
|---|---|---|---|
| Addition amount (mol/ton) | 1.7 | 3.5 | — |
| Phosphoric acid/alkali metal phosphate | 0.24 | 0.54 | — |
| pH | 4.0 | 5.5 | — |
| Alkali metal | Na | Na | — |
| Amount of alkali metal (ppm) | 39 | 81 | — |
| Divalent metal | Mg | Mg | Mg |
| Amount of divalent metal (ppm) | 68 | 68 | 68 |
| Polymerization catalyst metal | Sb | Sb | Sb |
| Amount of polymerization catalyst metal (ppm) | 251 | 251 | 251 |
| Total amount of metal (ppm) | 358 | 400 | 319 |
| Amount of phosphorus (ppm) | 65 | 124 | 59 |
| Nitrogen content (ppm) | 60 | 60 | 60 |
| Intrinsic viscosity | 0.85 | 0.85 | 0.85 |

TABLE 4-continued

| Alkali metal phosphate | Comparative Example 1 Sodium dihydrogen phosphate | Comparative Example 2 Sodium dihydrogen phosphate | Comparative Example 3 — |
|---|---|---|---|
| COOH terminal group (eq./t) | 15.5 | 10.2 | 17.9 |
| ΔCOOH terminal group (eq./t) | 90.3 | 85.6 | 120.5 |
| Retention of elongation (%) | 35 | 20 | 10 |

COOH terminal group: a value of a chip before shaping
ΔCOOH: the increase in the number of COOH terminal groups between before and after a wet-heating treatment of an undrawn sheet

TABLE 5

| Alkali metal phosphate | Comparative Example 4 Sodium dihydrogen phosphate | Comparative Example 5 Sodium dihydrogen phosphate | Comparative Example 6 Sodium dihydrogen phosphate |
|---|---|---|---|
| Addition amount (mol/ton) | 1.7 | 1.7 | 1.2 |
| Phosphoric acid/alkali metal phosphate | 1.12 | — | 1.10 |
| (Phosphoric acid compound/alkali metal phosphate) | (trimethyl phosphate) | | |
| pH | 6.5 | — | 5.0 |
| Alkali metal | Na | Na | Na |
| Amount of alkali metal (ppm) | 39 | 39 | 28 |
| Divalent metal | Mg | Mg | Mg |
| Amount of divalent metal (ppm) | 68 | 68 | 68 |
| Polymerization catalyst metal | Sb | Sb | Sb |
| Amount of polymerization catalyst metal (ppm) | 251 | 251 | 251 |
| Total amount of metal (ppm) | 358 | 358 | 347 |
| Amount of phosphorus (ppm) | 112 | 53 | 78 |
| Nitrogen content (ppm) | 60 | 60 | 60 |
| Intrinsic viscosity | 0.82 | 0.88 | 0.81 |
| COOH terminal group (eq./t) | 12.0 | 14.0 | 10.5 |
| ΔCOOH terminal group (eq./t) | 75 | 95 | 70.1 |
| Retention of elongation (%) | 35 | 30 | 45 |

COOH terminal group: a value of a chip before shaping
ΔCOOH: the increase in the number of COOH terminal groups between before and after a wet-heating treatment of an undrawn sheet

TABLE 6

| Alkali metal phosphate | Example 10 Sodium dihydrogen phosphate | Example 11 Sodium dihydrogen phosphate | Example 12 Sodium dihydrogen phosphate |
|---|---|---|---|
| Addition amount (mol/ton) | 1.4 | 2.8 | 1.7 |
| Phosphoric acid/alkali metal phosphate | 0.45 | 1.45 | 1.12 |
| pH | 5.8 | 5.0 | 5.0 |
| Alkali metal | Na | Na | Na |
| Amount of alkali metal (ppm) | 32 | 64 | 39 |
| Divalent metal | Mg | Mg | Mg |
| Amount of divalent metal (ppm) | 68 | 68 | 40 |
| Polymerization catalyst metal | Sb | Sb | Sb |
| Amount of polymerization catalyst metal (ppm) | 251 | 251 | 251 |
| Total amount of metal (ppm) | 351 | 383 | 340 |
| Amount of phosphorus (ppm) | 63 | 212 | 112 |
| Nitrogen content (ppm) | 60 | 60 | 60 |
| Intrinsic viscosity | 0.81 | 0.71 | 0.85 |
| COOH terminal group (eq./t) | 12.2 | 18.1 | 13.1 |
| ΔCOOH terminal group (eq./t) | 45.1 | 78.1 | 45.2 |
| Retention of elongation (%) | 59 | 51 | 60 |

COOH terminal group: a value of a chip before shaping
ΔCOOH: the increase in the number of COOH terminal groups between before and after a wet-heating treatment of an undrawn sheet

TABLE 7

| Alkali metal phosphate | Example 13 Sodium dihydrogen phosphate | Example 14 Sodium dihydrogen phosphate | Example 15 Sodium dihydrogen phosphate |
|---|---|---|---|
| Addition amount (mol/ton) | 1.7 | 1.7 | 1.7 |
| Phosphoric acid/alkali metal phosphate | 1.12 | 1.12 | 1.12 |
| pH | 5.0 | 5.0 | 5.0 |
| Alkali metal | Na | Na | Na |
| Amount of alkali metal (ppm) | 39 | 39 | 39 |
| Divalent metal | Mg | Mn | Ca |
| Amount of divalent metal (ppm) | 40 | 156 | 113 |
| Polymerization catalyst metal | Sb | Sb | Sb |
| Amount of polymerization catalyst metal (ppm) | 251 | 251 | 403 |
| Total amount of metal (ppm) | 340 | 446 | 358 |
| Amount of phosphorus (ppm) | 112 | 112 | 112 |
| Nitrogen content (ppm) | 60 | 60 | 60 |
| Intrinsic viscosity | 0.68 | 0.83 | 0.83 |
| COOH terminal group (eq./t) | 25 | 9.2 | 11.0 |
| ΔCOOH terminal group (eq./t) | 92 | 32.1 | 33.3 |
| Retention of elongation (%) | 50 | 65 | 65 |

COOH terminal group: a value of a chip before shaping
ΔCOOH: the increase in the number of COOH terminal groups between before and after a wet-heating treatment of an undrawn sheet

TABLE 8

| Alkali metal phosphate | Comparative Example 7 Sodium dihydrogen phosphate | Comparative Example 8 Sodium dihydrogen phosphite | Comparative Example 9 Sodium phosphite |
|---|---|---|---|
| Addition amount (mol/ton) | 1.7 | 1.7 | 1.7 |
| Phosphoric acid/alkali metal phosphate | 1.60 | — | 1.12 |
| pH | 3.5 | — | 3.0 |
| Alkali metal | Na | Na | Na |
| Amount of alkali metal (ppm) | 39 | 39 | 39 |
| Divalent metal | Mg | Mg | Mg |
| Amount of divalent metal (ppm) | 68 | 68 | 68 |
| Polymerization catalyst metal | Sb | Sb | Sb |
| Amount of polymerization catalyst metal (ppm) | 251 | 251 | 251 |
| Total amount of metal (ppm) | 358 | 358 | 358 |
| Amount of phosphorus (ppm) | 137 | 53 | 112 |
| Nitrogen content (ppm) | 60 | 60 | 60 |
| Intrinsic viscosity | 0.78 | 0.64 | 0.80 |
| COOH terminal group (eq./t) | 13.5 | 15.2 | 11.2 |
| ΔCOOH terminal group (eq./t) | 62.0 | 98.1 | 85.5 |
| Retention of elongation (%) | 45 | 10 | 30 |

COOH terminal group: a value of a chip before shaping
ΔCOOH: the increase in the number of COOH terminal groups between before and after a wet-heating treatment of an undrawn sheet

TABLE 9

| | Example 16 | Example 17 | Example 18 |
|---|---|---|---|
| Copolymerized component | TMTM | TMTM | BTCA |
| Copolymerized amount (mol %) | 0.05 | 0.5 | 0.10 |
| Alkali metal phosphate | Sodium dihydrogen phosphate | Sodium dihydrogen phosphate | Sodium dihydrogen phosphate |
| Addition amount (mol/ton) | 1.7 | 1.7 | 1.7 |
| Phosphoric acid/alkali metal phosphate | 1.12 | 1.12 | 1.12 |
| pH | 5.0 | 5.0 | 5.0 |
| Alkali metal | Na | Na | Na |
| Amount of alkali metal (ppm) | 39 | 39 | 39 |
| Divalent metal | Mg | Mg | Mg |
| Amount of divalent metal (ppm) | 68 | 68 | 68 |
| Polymerization catalyst metal | Sb | Sb | Sb |
| Amount of polymerization catalyst metal (ppm) | 251 | 251 | 251 |
| Total amount of metal (ppm) | 358 | 358 | 358 |

TABLE 9-continued

| | Example 16 | Example 17 | Example 18 |
|---|---|---|---|
| Amount of phosphorus (ppm) | 112 | 112 | 112 |
| Nitrogen content (ppm) | 60 | 60 | 60 |
| Intrinsic viscosity | 0.85 | 0.90 | 0.80 |
| COOH terminal group (eq./t) | 9.2 | 8.5 | 9.1 |
| ΔCOOH terminal group (eq./t) | 33.0 | 32.8 | 33.2 |
| Retention of elongation (%) | 72 | 82 | 70 |

COOH terminal group: a value of a chip before shaping
ΔCOOH: the increase in the number of COOH terminal groups between before and after a wet-heating treatment of an undrawn sheet
TMTM: trimethyl trimellitate
BTCA: butane tetracarboxylic acid

The invention claimed is:

1. A polyester resin composition comprising an alkali metal phosphate in an amount of 1.5 mol/ton to 2.0 mol/ton, and phosphoric acid in an amount of 0.4 to 1.5 times (by mole) that of the alkali metal phosphate, wherein an increase in COOH between before and after a wet-heating treatment performed at 155° C. for 4 hours under saturated steam is 90 eq./ton or less.

2. The polyester resin composition according to claim 1, wherein polyester comprising the polyester resin composition is polyethylene terephthalate.

3. The polyester resin composition according to claim 1, wherein content of nitrogen element is less than 100 ppm.

4. The polyester resin composition according to claim 1, wherein an amount of COOH terminal groups is 20 eq./ton or less.

5. The polyester resin composition according to claim 1, wherein the polyester resin composition comprises a metal compound whose metal element is at least one member selected from the group consisting of Na, Li, and K, a metal compound whose metal element is at least one member selected from the group consisting of Mg, Ca, Mn, and Co, and a metal compound whose metal element is at least one member selected from the group consisting of Sb, Ti, and Ge, wherein the total amount of the metal elements is 30 ppm to 500 ppm relative to the polyester resin composition as a whole, and the phosphorus compound is contained in an amount of 30 ppm to 150 ppm in terms of an amount of phosphorus element relative to the polyester resin composition as a whole.

6. The polyester resin composition according to claim 1, wherein the polyester resin composition comprises at least one member selected from the group consisting of polycarboxylic acid components having three or more functionalities, polyhydric alcohol components having three or more functionalities, and polyhydroxycarboxylic acid components having three or more functionalities in an amount of 0.01 mol % to 1.0 mol % relative to all the acid components.

7. The polyester resin composition according to claim 2, wherein content of nitrogen element is less than 100 ppm.

8. The polyester resin composition according to claim 2, wherein an amount of COOH terminal groups is 20 eq./ton or less.

9. The polyester resin composition according to claim 3, wherein an amount of COOH terminal groups is 20 eq./ton or less.

10. The polyester resin composition according to claim 2, wherein the polyester resin composition comprises a metal compound whose metal element is at least one member selected from the group consisting of Na, Li, and K, a metal compound whose metal element is at least one member selected from the group consisting of Mg, Ca, Mn, and Co, and a metal compound whose metal element is at least one member selected from the group consisting of Sb, Ti, and Ge, wherein the total amount of the metal elements is 30 ppm to 500 ppm relative to the polyester resin composition as a whole, and the phosphorus compound is contained in an amount of 30 ppm to 150 ppm in terms of an amount of phosphorus element relative to the polyester resin composition as a whole.

11. The polyester resin composition according to claim 3, wherein the polyester resin composition comprises a metal compound whose metal element is at least one member selected from the group consisting of Na, Li, and K, a metal compound whose metal element is at least one member selected from the group consisting of Mg, Ca, Mn, and Co, and a metal compound whose metal element is at least one member selected from the group consisting of Sb, Ti, and Ge, wherein the total amount of the metal elements is 30 ppm to 500 ppm relative to the polyester resin composition as a whole, and the phosphorus compound is contained in an amount of 30 ppm to 150 ppm in terms of an amount of phosphorus element relative to the polyester resin composition as a whole.

* * * * *